United States Patent Office 3,085,042
Patented Apr. 9, 1963

3,085,042
PHYTOTOXICITY OF MANGANESE ETHYLENE-BISDITHIOCARBAMATE REDUCED BY THE ADDITION OF ZINC AND CADMIUM IONS
Christian B. Luginbuhl, Wilmington, Del., assignor to E. I. du Pont de Nemours and Company, Wilmington, Del., a corporation of Delaware
No Drawing. Filed June 9, 1961, Ser. No. 115,920
10 Claims. (Cl. 167—22)

This invention relates to reducing the phytotoxicity of fungicidal compositions containing manganese ethylenebisdithiocarbamate. It is more particularly directed to reducing the phytotoxicity of these compositions by the addition of small amounts of water-soluble zinc or cadmium salts.

According to this invention, the phytotoxicity of manganese ethylenebisdithiocarbamate, commonly called "maneb," can be significantly reduced by contacting it with zinc or cadmium ions. It is essential that the two entities be brought together in the presence of water, and the zinc or cadmium salts which supply the ions must therefore be water-soluble.

Of the water-soluble salts it has been found that sulfates, halides, nitrates, acetates, formates and lactates are most effective; of these, the sulfates, chlorides, bromides and acetates are preferred. $ZnSO_4$ is especially preferred.

The precise amount of zinc or cadmium ions necessary to achieve the desired reduction in phytotoxicity will, of course, depend on the amount of maneb in the composition and the composition's intended use. Generally, however, a concentration of from 0.25 to 5 mole percent based on the amount of manganese ethylenebisdithiocarbamate present will be sufficient.

The maneb and water-soluble zinc or cadmium salts can be brought together in any convenient fashion. For example, a dry fungicidal composition containing maneb can be mixed with dry water-soluble zinc or cadmium salts.

Alternatively, the zinc or cadmium ions can be contacted with the maneb during its manufacture by dissolving the salts in the water slurry of maneb, in the maneb filter cake wash water, or in the wet filter cake. When introduced in this fashion, substantially all of the ions cannot be removed from the maneb by subsequent washing.

The actual physical structure of the maneb-zinc-cadmium ion composition is not known. According to the best available information, however, it is believed that the zinc or cadmium ions are either isomorphically substituted into the maneb crystal lattice, are fixed on the surface of the maneb molecule in some fashion, or react with a phytotoxic fraction of the maneb to tie it up. It is intended that this invention embrace these compositions, whatever their structure.

This "safened" maneb can be formulated into fungicidal compositions by using agricultural adjuvants and diluents. Such adjuvants and diluents, and methods for preparing fungicidal compositions of maneb with them, are disclosed in U.S. Patent 2,504,404 to Albert Flenner. The portions of that patent which disclose adjuvants, diluents, and formulation methods are incorporated into this application by reference. "Safened" maneb constitutes from 5% to 95% of such compositions.

In formulating fungicidal compositions containing "safened" maneb, one should avoid using adjuvants or diluents which chemically tie up zinc or cadmium ions. The reason for this is obvious.

It has also been discovered that the stability of fungicidal compositions containing "safened" maneb can be greatly enhanced by the addition of from 0.25% to 5% by weight of paraformaldehyde. Details regarding this stability phenomenon are disclosed in copending application Serial No. 115,921, filed June 9, 1961. Similarly, the stability of "safened" maneb compositions can be enhanced by the addition of hexamethylenetetramine, as is disclosed in U.S. Patent 2,974,156. A preferred fungicidal composition according to this invention will therefore also include a stabilizing amount of paraformaldehyde or hexamethylenetetramine.

Fungicidal compositions in which the maneb has been "safened" with zinc or cadmium ions, and such compositions which have been stabilized by the addition of paraformaldehyde or hexamethylenetetramine can be used as full equivalents of the fungicidal compositions disclosed and claimed in Flenner, U.S. Patent 2,504,404. The addition of cadmium ions, zinc ions, together with paraformaldehyde or hexamethylenetetramine leaves the fungicidal effectiveness of the compositions unimpaired.

It should be noted that when cadmium ions are used to reduce the phytotoxicity of maneb, the composition should not be used on crops which are intended for human consumption because of its toxicity. Zinc ions are therefore preferred.

The following examples are presented so that this invention may be more readily understood and more easily practiced.

Example 1

Dry maneb was intimately mixed with 2% by weight of zinc sulfate monohydrate. The mixture was blended and then ground in a hammer mill at high speed.

This mixture was applied to young tomato plants as a water slurry containing 6 pounds of the blended product per hundred gallons.

A significant reduction in phytotoxicity was observed as compared with tomato plants which had been sprayed with a water slurry of 6 pounds of maneb in 100 gallons of water. There was no observable difference between the composition containing the zinc sulfate and that not containing zinc sulfate so far as fungicidal activity was concerned.

Example 2

Manganese ethylenebisdithiocarbamate was prepared by adding an aqueous solution of manganese sulfate to an aqueous solution of disodium ethylenebisdithiocarbamate. The resulting precipitate was separated by filtration and then washed with a 2% aqueous solution of zinc sulfate. The precipitate was then dried in a stream of heated air.

A test of this material, conducted in the same manner as in Example 1, showed a significant reduction in phytotoxicity as compared with maneb not so treated, while the fungicidal activity of the two materials was substantially the same.

Example 3

Dry maneb and 2% by weight of cadmium chloride were thoroughly blended and then pulverized in a hammer mill.

This mixture was applied to young tomato plants as a water slurry, such as is described in Example 1.

A marked reduction in phytotoxicity was observed, with little or no change in the maneb's fungicidal effectiveness.

Example 4

Manganese ethylenebisdithiocarbamate was prepared as described in Example 2 except that the precipitate was washed with a 2% aqueous solution of zinc chloride and then dried in a stream of heated air.

The results with this composition on tomato plants were similar to those obtained with the composition described in Example 2: a significant decrease in phytotoxicity, with little or no change in fungicidal activity.

Example 5

A fungicidal composition was prepared according to the following formula:

| | Percent |
|---|---|
| Manganese ethylenebisdithiocarbamate | 96.25 |
| Paraformaldehyde | 1.00 |
| Zinc sulfate | 1.00 |
| Sodium lignosulfonate | 1.00 |
| Sodium alkylnaphthalene wetting agent | .5 |
| Methylcellulose | .25 |

These ingredients were mixed, blended and then ground in a hammer mill.

This formulation was evaluated in the manner described in Example 1. It was found to be less phytotoxic than similar compositions having no zinc sulfate present, and more stable than such compositions not having formaldehyde present, while still having the same order of fungicidal activity.

Example 6

A fungicidal composition similar to that in Example 5 was prepared, substituting 2% hexamethylenetetramine for the paraformaldehyde and 2% zinc acetate for the zinc sulfate.

The composition was less phytotoxic and more stable than such compositions lacking these ingredients.

The embodiments of the invention in which an exclusive property or privilege is claimed are:

1. A fungicidal composition comprising from 5% to 95%, by weight, of manganese ethylenebisdithiocarbamate and from 0.25 to 5 mole percent, based on the manganese ethylenebisdithiocarbamate present, of an ion selected from the group consisting of zinc ions and cadmium ions.

2. A fungicidal composition comprising manganese ethylenebisdithiocarbamate and a compound selected from the group consisting of water-soluble zinc salts and water-soluble cadmium salts.

3. A fungicidal composition comprising from 5% to 95%, by weight, of manganese ethylenebisdithiocarbamate, from 0.25 to 5 mole percent, based on the manganese ethylenebisdithiocarbamate present, of a compound selected from the group consisting of water-soluble zinc salts and water-soluble cadmium salts, and an inert carrier.

4. A fungicidal composition comprising from 5% to 95%, by weight, of manganese ethylenebisdithiocarbamate, from 0.25 to 5 mole percent, based on the manganese ethylenebisdithiocarbamate present, of a compound selected from the group consisting of water-soluble zinc salts and water-soluble cadmium salts, from .25% to 5%, by weight, of paraformaldehyde, and an inert carrier.

5. A method for reducing the phytotoxicity of manganese ethylenebisdithiocarbamate, said method comprising contacting said manganese ethylenebisdithiocarbamate, in the presence of water, with an ion selected from the group consisting of zinc ions and cadmium ions.

6. A fungicidal composition comprising from 5% to 95%, by weight, of manganese ethylenebisdithiocarbamate, from 0.25 to 5 mole percent, based on the manganese ethylenebisdithiocarbamate present, of a compound selected from the group consisting of water-soluble zinc salts and water-soluble cadmium salts, from .25% to 5%, by weight, of hexamethylenetetramine, and an inert carrier.

7. A dry fungicidal composition comprising manganese ethylenebisdithiocarbamate and a compound selected from the group consisting of water-soluble zinc salts and water-soluble cadmium salts.

8. A dry fungicidal composition comprising from 5% to 95%, by weight, of manganese ethylenebisdithiocarbamate and from 0.25 to 5 mol percent, based on the manganese ethylenebisdithiocarbamate present, of a compound selected from the group consisting of water-soluble zinc salts and water-soluble cadmium salts.

9. A fungicidal composition comprising 5% to 95%, by weight, of manganese ethylenebisdithiocarbamate, and 0.25% to 5%, by weight, of paraformaldehyde, the phytotoxicity of said composition being reduced by the presence of from 0.25 to 5 mole percent, based on the manganese ethylenebisdithiocarbamate present, of an ion selected from the group consisting of zinc ions and cadmium ions.

10. A fungicidal composition comprising 5% to 95%, by weight, of manganese ethylenebisdithiocarbamate and 0.25% to 5%, by weight, of hexamethylenetetramine, the phytotoxicity of said composition being reduced by the presence of from 0.25 to 5 mole percent, based on the manganese ethylenebisdithiocarbamate present, of an ion selected from the group consisting of zinc ions and cadmium ions.

References Cited in the file of this patent
UNITED STATES PATENTS

| 2,412,720 | Dolman | Dec. 17, 1946 |
| 2,504,404 | Flenner | Apr. 18, 1950 |
| 2,974,156 | Sobatzki | Mar. 7, 1961 |

Notice of Adverse Decision in Interference

In Interference No. 94,033, involving Patent No. 3,085,042, C. B. Luginbuhl, PHYTOTOXICITY OF MANGANESE ETHYLENEBISDITHIOCARBAMATE REDUCED BY THE ADDITION OF ZINC AND CADMIUM IONS, final judgment adverse to the patentee was rendered May 31, 1967, as to claims 2, 5 and 7.

[*Official Gazette November 15, 1983.*]